(12) United States Patent
Tanabe et al.

(10) Patent No.: US 10,158,241 B2
(45) Date of Patent: *Dec. 18, 2018

(54) ELECTRICITY STORAGE SYSTEM

(71) Applicant: TOYOTA JIDOSHA KABUSHIKI KAISHA, Aichi-ken, Toyota-shi (JP)

(72) Inventors: Yukinari Tanabe, Nagoya (JP); Yuji Nishi, Nagoya (JP); Hiroyuki Kaiya, Toyota (JP); Hiromasa Tanaka, Okazaki (JP); Keiji Kaita, Miyoshi (JP); Motoi Ito, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/649,014

(22) PCT Filed: Dec. 3, 2012

(86) PCT No.: PCT/JP2012/007733
§ 371 (c)(1),
(2) Date: Jun. 2, 2015

(87) PCT Pub. No.: WO2014/087442
PCT Pub. Date: Jun. 12, 2014

(65) Prior Publication Data
US 2015/0357856 A1    Dec. 10, 2015

(51) Int. Cl.
*H02J 7/04* (2006.01)
*H02J 7/16* (2006.01)
(Continued)

(52) U.S. Cl.
CPC .......... *H02J 7/0077* (2013.01); *H02H 3/20* (2013.01); *H02H 7/18* (2013.01); *H02J 7/00* (2013.01);
(Continued)

(58) Field of Classification Search
USPC ..................................... 320/163, 104–105
See application file for complete search history.

(56) References Cited

U.S. PATENT DOCUMENTS 5,321,389 A    6/1994  Meister
5,804,944 A    9/1998  Alberkrack et al.
(Continued)

FOREIGN PATENT DOCUMENTS

CN    101008094 A    8/2007
CN    101197507 A    6/2008
(Continued)

OTHER PUBLICATIONS

Communication dated Nov. 4, 2016, from the United States Patent and Trademark Office in counterpart U.S. Appl. No. 14/425,492.
(Continued)

*Primary Examiner* — Samuel Berhanu
(74) *Attorney, Agent, or Firm* — Sughrue Mion, PLLC

(57) ABSTRACT

An electricity storage system includes an electricity storage block including an electricity storage element for performing charging and discharging; a relay switched between an ON state in which the electric storage block is connected to a load and an OFF state in which a connection between the electricity storage block and the load is cut off; a controller for controlling the ON state and the OFF state of the relay; and a current cutoff circuit so as to cut off energization of the electricity storage block. The current cutoff circuit has an alarm circuit to indicate that the electricity storage block is in an overcharged state by comparing a voltage value of the electricity storage block and a threshold; a latch circuit retains the alarm signal; and a transistor receives an output signal of the latch circuit and switches the relay from the ON state to the OFF state.

10 Claims, 7 Drawing Sheets

(51) Int. Cl.
    *H02J 7/00* (2006.01)
    *H02H 3/20* (2006.01)
    *H02H 7/18* (2006.01)

(52) U.S. Cl.
    CPC ..... *H02J 7/0047* (2013.01); *H02J 2007/0049* (2013.01)

(56) References Cited

U.S. PATENT DOCUMENTS

| | | | |
|---|---|---|---|
| 5,986,865 | A | 11/1999 | Umeki et al. |
| 8,248,030 | B2 | 8/2012 | Doepke et al. |
| 8,924,059 | B2 * | 12/2014 | Yoshikawa ............ G05B 19/02 701/22 |
| 2006/0103351 | A1 | 5/2006 | Tanigawa et al. |
| 2010/0001651 | A1 | 1/2010 | Lin |
| 2010/0082198 | A1 * | 4/2010 | Arai ................ B60R 16/033 701/31.4 |
| 2010/0123434 | A1 | 5/2010 | Iwata |
| 2011/0140669 | A1 | 6/2011 | Murakami et al. |
| 2011/0149454 | A1 | 6/2011 | Shibuya et al. |
| 2012/0038325 | A1 | 2/2012 | Morita et al. |
| 2012/0069481 | A1 | 3/2012 | Yamada |
| 2013/0116875 | A1 | 5/2013 | Oh et al. |
| 2013/0141828 | A1 | 6/2013 | Yamaguchi et al. |
| 2013/0241480 | A1 * | 9/2013 | Kirimoto ............ B60L 11/1866 320/109 |
| 2013/0335095 | A1 | 12/2013 | Kiuchi |
| 2014/0015454 | A1 * | 1/2014 | Kunimitsu ........ H01M 10/4257 318/139 |
| 2015/0229154 | A1 | 8/2015 | Kaita et al. |
| 2015/0357856 | A1 | 12/2015 | Tanabe et al. |

FOREIGN PATENT DOCUMENTS

| | | | |
|---|---|---|---|
| CN | 101620829 | A | 1/2010 |
| CN | 102012475 | A | 4/2011 |
| CN | 102436281 | A | 5/2012 |
| EP | 1533881 | A2 | 5/2005 |
| EP | 2141782 | A2 | 1/2010 |
| JP | 01-127983 | A | 5/1989 |
| JP | 05133986 | A | 5/1993 |
| JP | 07-105986 | A | 4/1995 |
| JP | 09-331629 | A | 12/1997 |
| JP | 10012282 | A | 1/1998 |
| JP | 11098701 | A | 4/1999 |
| JP | 11-155237 | A | 6/1999 |
| JP | 11215716 | A | 8/1999 |
| JP | 2000-166108 | A | 6/2000 |
| JP | 2000-312439 | A | 11/2000 |
| JP | 2001-136666 | A | 5/2001 |
| JP | 2001-524300 | A | 11/2001 |
| JP | 2003-346916 | A | 12/2003 |
| JP | 2005245049 | A | 9/2005 |
| JP | 3780977 | B2 | 5/2006 |
| JP | 2007033108 | A | 2/2007 |
| JP | 2008-199761 | A | 8/2008 |
| JP | 2008312396 | A | 12/2008 |
| JP | 2009-178014 | A | 8/2009 |
| JP | 2009-219215 | A | 9/2009 |
| JP | 2010110156 | A | 5/2010 |
| JP | 4533357 | B2 | 9/2010 |
| JP | 2011-076778 | A | 4/2011 |
| JP | 2011-136666 | A | 7/2011 |
| JP | 2012-050258 | A | 3/2012 |
| JP | 2012-065447 | A | 3/2012 |
| KR | 10-1998-0046978 | A | 9/1998 |
| KR | 20-1999-0032282 | U | 7/1999 |
| KR | 10-2002-0087190 | A | 11/2002 |
| KR | 2003-0039579 | A | 5/2003 |
| KR | 20-0439685 | Y1 | 4/2008 |
| KR | 10-2012-0024738 | A | 3/2012 |
| TW | 411646 | B | 11/2000 |
| WO | 98/45924 | A2 | 10/1998 |
| WO | 2011111350 | A1 | 9/2011 |
| WO | 2012005554 | A2 | 1/2012 |
| WO | 2012/132220 | A | 10/2012 |
| WO | 2012132178 | A1 | 10/2012 |

OTHER PUBLICATIONS

Communication dated Jan. 12, 2017, from the United States Patent and Trademark Office in counterpart U.S. Appl. No. 14/424,250.
Communication dated Jun. 30, 2017 from the United States Patent and Trademark Office in counterpart U.S. Appl. No. 14/424,250.
Communication dated Oct. 23, 2017, from the United States Patent and Trademark Office in U.S. Appl. No. 14/424,250.
Communication dated Sep. 14, 2017, from the United States Patent and Trademark Office in U.S. Appl. No. 14/431,601.
Communication dated Mar. 21, 2018 from the United States Patent and Trademark Office in U.S. Appl. No. 14/431,601.
Communication dated Mar. 15, 2018 from the United States Patent and Trademark Office in U.S. Appl. No. 14/424,250.
Communication dated Nov. 27, 2017 issued from the United States Patent and Trademark Office in U.S. Appl. No. 14/424,250.
Communication dated Jan. 11, 2018 issued from the United States Patent and Trademark Office in U.S. Appl. No. 14/424,250.
Notice of Allowance, dated Jul. 17, 2018, issued by the U.S. Patent and Trademark Office in U.S. Appl. No. 14/431,601.

* cited by examiner

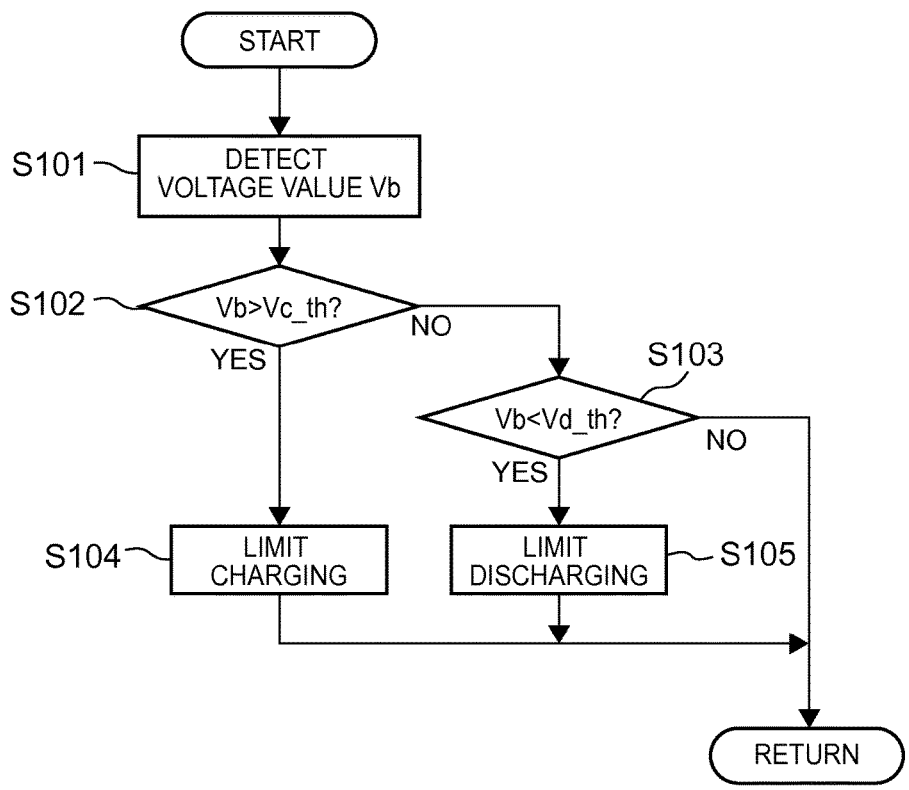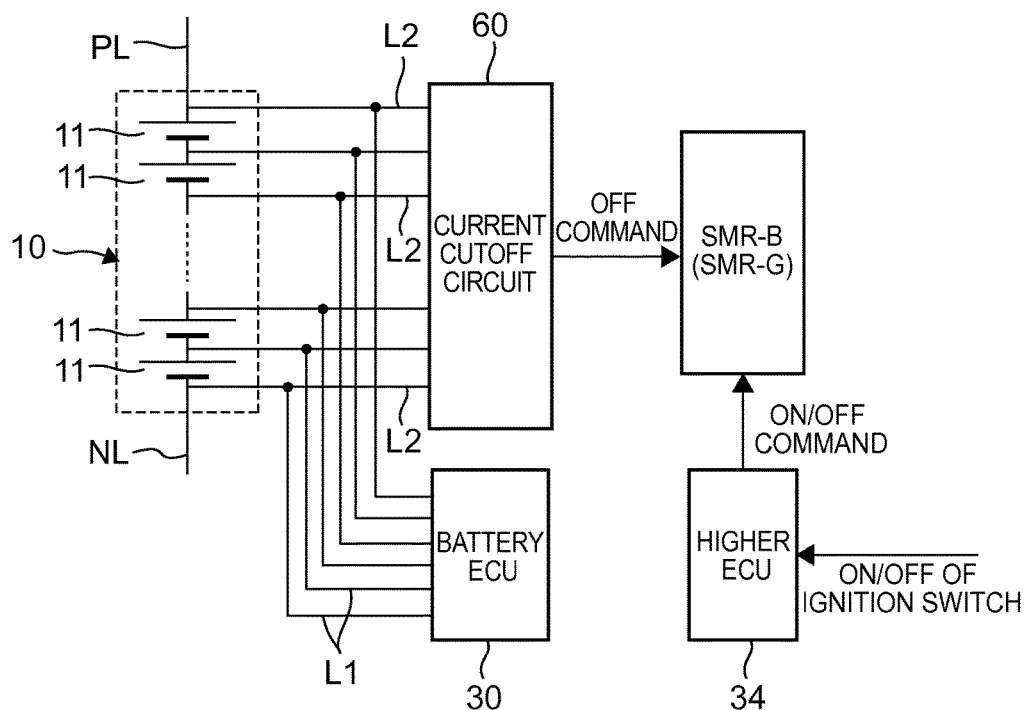

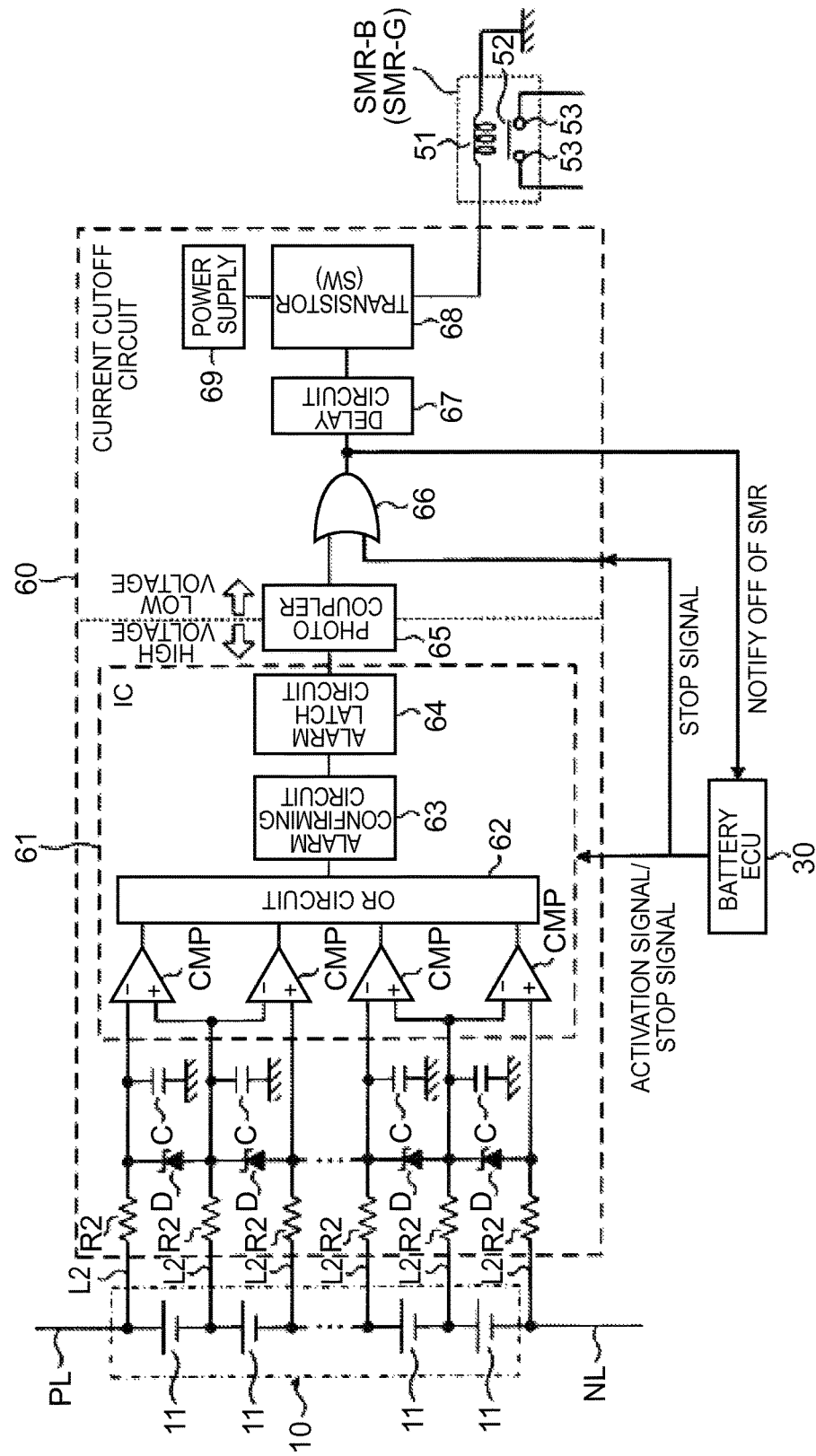

ELECTRICITY STORAGE SYSTEM

TECHNICAL FIELD

The invention relates to a technique for cutting off energization of an electricity storage block regardless of control by a controller.

BACKGROUND ART

It is described in Patent Literature 1 that, when a charging current flows into a secondary battery, a system main relay is turned off to suppress overcharging of the secondary battery. A connection between the secondary battery and a load can be cut off by turning off the system main relay. In this way, charging of the secondary battery can be stopped, and thus the overcharging of the secondary battery can be suppressed.

RELATED ART LITERATURE

Patent Literature

Patent Literature 1: Japanese Patent Application Publication No. 2008-199761 (JP 2008-199761 A)
Patent Literature 2: Japanese Patent Application Publication No. 2009-178014 (JP 2009-178014 A)

SUMMARY OF THE INVENTION

Problem to be Solved by the Invention

In Patent Literature 1, a central processing unit (CPU) provided in an electric control unit (ECU) controls ON/OFF of the system main relay. The CPU executes another type of control in addition to drive control of the system main relay, and there is a case where the CPU changes a program stored therein. Here, in the case where the program is changed, it is necessary to check whether the drive control of the system main relay, that is, control for suppressing the overcharging is properly executed after the program is changed.

Means for Solving the Problem

An electricity storage system as a first invention of the subject application has an electricity storage block that includes an electricity storage element for performing charging and discharging, a relay, a controller, and a current cutoff circuit. The relay is switched between an ON state in which the electricity storage block is connected to a load and an OFF state in which a connection between the electricity storage block and the load is cut off. The controller controls ON and OFF of the relay. The current cutoff circuit switches the relay from ON to OFF, so as to cut off energization of the electricity storage block.

The current cutoff circuit has an alarm circuit, a latch circuit, and a transistor. The alarm circuit outputs an alarm signal indicating that the electricity storage block is in an overcharged state by comparing a voltage value of the electricity storage block and a threshold. The latch circuit retains the alarm signal and outputs the retained signal. The transistor receives the output signal of the latch circuit and switches the relay from ON to OFF.

The electricity storage block may be constructed of the one electric storage element or may be constructed of the plural electricity storage elements. When the electricity storage block is constructed of the plural electricity storage elements, the plural electricity storage elements can electrically be connected in series or can electrically be connected in parallel. In addition, the plural electricity storage blocks are prepared, and the plural electricity storage blocks can electrically be connected in series. When the plural electricity storage blocks are used, the alarm circuit detects the voltage value of each of the electricity storage blocks and determines whether each of the electricity storage blocks is in the overcharged state.

According to the first invention of the subject application, when the controller outputs the control signal, the relay can be switched between ON and OFF. In addition, in the first invention of the subject application, the relay can be switched from ON to OFF by using the current cutoff circuit in a line that differs from a line in which the controller controls driving of the relay.

In other words, the current cutoff circuit can switch the relay from ON to OFF in an independent manner from the control by the controller. Thus, even when a program stored in the controller (a microcomputer) is changed, the relay can be switched from ON to OFF by using the current cutoff circuit during the overcharged state of the electricity storage block. Just as described, the current cutoff circuit can be kept used regardless of the controller. Thus, versatility of the current cutoff circuit can be improved.

In addition, since processing of the program is not included in an operation of the current cutoff circuit, the relay can be switched from ON to OFF with no consideration of a program bug. An electric element provided in the current cutoff circuit can be formed of a semiconductor element, deterioration by wear (deterioration by aging) of which is less likely to be progressed. Thus, reliability of a component can be improved.

The current cutoff circuit has the latch circuit. Thus, when the alarm signal is output from the alarm circuit, the alarm signal can be kept output from the latch circuit. In this way, the relay can remain OFF. When the relay is switched from ON to OFF by the current cutoff circuit, the voltage value of the electricity storage block is reduced in conjunction with elimination of polarization of the electricity storage block. There is a case where the alarm signal is not output from the alarm circuit when the voltage value of the electricity storage block is reduced. More specifically, there is a case where the alarm signal is not output from the alarm circuit when the voltage value of the electricity storage block becomes lower than a threshold.

When the alarm signal is no longer output, the voltage value of the electricity storage block is increased in conjunction with the energization of the electricity storage block. Thus, there is a case where the alarm signal is output from the alarm circuit again. If the latch circuit is removed here, the alarm signal is output or not output from the alarm circuit. In conjunction with this, the relay may repeatedly be switched between ON and OFF, and this progresses the deterioration by wear of the relay.

According to the first invention of the subject application, after the alarm signal is output from the alarm circuit, the alarm signal is retained by the latch circuit. In conjunction with this, it is possible to prevent the alarm signal from being output or not being output and further prevent the relay from being repeatedly switched between ON and OFF. Thus, the progress in the deterioration by wear of the relay can be suppressed.

As the alarm circuit, a first comparator and a second comparator can be used. When a positive electrode terminal and a negative electrode terminal of the electricity storage block are each connected to an input terminal of the first comparator, a potential difference between a positive electrode and a negative electrode of the electricity storage block, in other words, the voltage value of the electricity storage block can be detected. In addition, output of the first comparator can be input to one input terminal of the second comparator, and the threshold (the voltage value) that is used to determine the overcharged state can be input to another input terminal of the second comparator.

In this way, the voltage value of the electricity storage block is compared with the threshold (the voltage value) by using the second comparator, and thus it is possible to determine whether the electricity storage block is in the overcharged state. When the voltage value of the electricity storage block is higher than the threshold (the voltage value), the second comparator (the alarm circuit) can output the alarm signal. On the contrary, when the voltage value of the electricity storage block is lower than the threshold (the voltage value), the second comparator (the alarm circuit) does not output the alarm signal.

A filter circuit can be connected to an output line of the second comparator. As the filter circuit, for example, a capacitor can be used. When the filter circuit is connected to the output line of the second comparator, noise contained in output of the second comparator can be reduced. Thus, reliability of an output signal (the alarm signal) of the second comparator can be improved.

A photocoupler can be provided between the latch circuit and the transistor. By using the photocoupler, a circuit that is located on an input side of the photocoupler and a circuit that is located on an output side of the photocoupler can be brought into insulated states. Since the voltage value of the electricity storage block is input to the circuit that is located on the input side of the photocoupler, the circuit that is located on the input side of the photocoupler becomes a circuit that is operated at high voltage. Here, the high voltage can be converted to low voltage by using the photocoupler, and thus the transistor can be operated at the low voltage.

The filter circuit can be provided in a line that connects between the alarm circuit and the electricity storage block. As the filter circuit, for example, the capacitor can be used. By using this filter circuit, when the alarm circuit detects the voltage value of the electric storage block, the voltage value can be detected in a state that the noise is reduced. In this way, accuracy of detecting the voltage value of the electricity storage block can be increased.

A Zener diode can electrically be connected in parallel to the electricity storage block. More specifically, a cathode of the Zener diode can be connected to the positive electrode terminal of the electricity storage block, and an anode of the Zener diode can be connected to the negative electrode terminal of the electricity storage block. In this way, when application of excess voltage is attempted from the electricity storage block to the current cutoff circuit, a current can flow from the cathode to anode. In this way, the application of the excess voltage to the current cutoff circuit can be suppressed.

Together with an engine, the electricity storage block can be mounted in a vehicle. Here, if power (electrical energy) output from the electricity storage block is converted to kinetic energy, the vehicle can travel by using this kinetic energy. In addition, startup (cranking) of the engine can be performed by using the power output from the electricity storage block.

In a configuration in which the electricity storage block and the engine are mounted in the vehicle, a delay circuit can be provided between the latch circuit and the transistor. Then, the output signal of the latch circuit can be input not only to the transistor but also to the controller. When the output signal of the latch circuit is input to the transistor, as described above, the relay is switched from ON to OFF, and the charging or discharging of the electricity storage block is stopped. After the charging or discharging of the electricity storage block is stopped, the engine can no longer be started by using the output power of the electricity storage block.

Here, if the delay circuit is provided between the latch circuit and the transistor, the transistor that receives the output signal of the latch circuit can delay timing at which the relay is switched from ON to OFF. Meanwhile, since the output signal of the latch circuit is input to the controller, the controller can start the engine on the basis of the output signal of the latch circuit. In other words, the controller can start the engine before the relay is switched from ON to OFF by the current cutoff circuit.

The controller can output a signal for stopping the operation of the current cutoff circuit. Accordingly, when the electricity storage system is not operated, the operation of the current cutoff circuit can be stopped. Thus, power consumption that is associated with the operation of the current cutoff circuit can be reduced.

An OR circuit can be provided between the latch circuit and the transistor. The output signal of the latch circuit and the signal for stopping the operation of the current cutoff circuit (the output signal of the controller) can be input to the OR circuit. Accordingly, even when the controller outputs the signal for stopping the operation of the current cutoff circuit, the transistor that receives the output of the OR circuit can switch the relay from ON to OFF.

In other words, in conjunction with stopping of the operation of the current cutoff circuit, the charging or discharging of the electricity storage block can be stopped. In this way, it is possible to prevent the charging or discharging of the electricity storage block from being performed in a state that the current cutoff circuit is not operated.

Similar to the first invention of the subject application, an electricity storage system according to a second invention of the subject application has the electricity storage block, the relay, the controller, and the current cutoff circuit. Here, the current cutoff circuit has the alarm circuit and the transistor. The alarm circuit outputs the alarm signal by comparing the voltage value of the electricity storage block and the threshold. The transistor receives the output signal of the alarm circuit and switches the relay from ON to OFF.

The alarm circuit includes a comparator having a hysteresis characteristic (a so-called hysteresis comparator). Here, the hysteresis is larger than a voltage drop amount in the electricity storage block after the energization of the electricity storage block is cut off.

According to the second invention of the subject application, the comparator provided in the alarm circuit is used, and thus the alarm signal can be output by comparing the voltage value of the electricity storage block and the threshold. In addition, the comparator has the hysteresis characteristic. Thus, after the alarm signal is output from the comparator, the threshold can be reduced by the hysteresis. After the energization of the electricity storage block is cut off, the polarization of the electricity storage block is eliminated. In this way, in conjunction with this, even when the voltage value of the electricity storage block is reduced, the voltage value of the electricity storage block is less likely to become lower than the threshold.

If the voltage value of the electricity storage block does not become lower than the threshold, the alarm circuit can keep outputting the alarm signal. Thus, similar to the first invention of the subject application, it is possible to suppress the relay from being repeatedly switched between ON and OFF and thus to suppress the progress in the deterioration by wear of the relay.

BRIEF DESCRIPTION OF THE DRAWINGS

FIG. 3 is a flowchart of processing for controlling charging and discharging of a battery pack on the basis of a voltage value of a battery cell.

FIG. 4 is a view of a configuration of a part of the battery system.

FIG. 5 is a view of a configuration of a current cutoff circuit.

MODES FOR CARRYING OUT THE INVENTION

A description will hereinafter be made on embodiments of the invention.

First Embodiment

Figure 1:
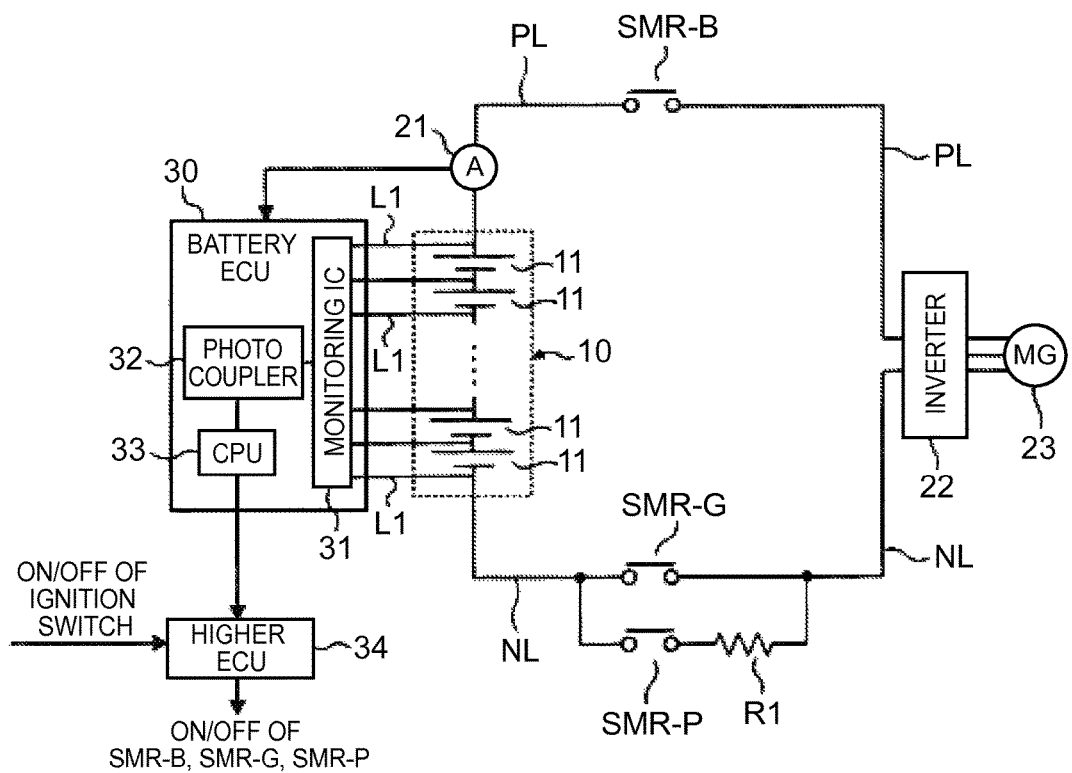
FIG. 1 is a view of a configuration of a battery system.

FIG. 1 is a view of a configuration of a battery system of this embodiment (corresponding to the electricity storage system of the invention). The battery system shown in FIG. 1 can be mounted in a vehicle, for example. In this vehicle, the vehicle can travel by using output of a battery pack 10. Noted that the invention can be applied to a machine other than the vehicle.

The battery pack 10 has plural battery cells (corresponding to electricity storage elements of the invention) 11 that are electrically connected in series. A secondary battery, such as a nickel hydrogen battery or a lithium ion battery, can be used as the battery cell 11. Alternatively, an electric double layer capacitor can be used instead of the secondary battery. The number of the battery cells 11 can appropriately be set on the basis of requested output of the battery pack 10 or the like. In this embodiment, although all of the battery cells 11, which constitute the battery pack 10, are electrically connected in series, the battery pack 10 may contain the plural battery cells 11 that are electrically connected in parallel.

A current sensor 21 detects a current flowing into the battery pack 10 and outputs a detected result to a battery electric control unit (ECU) 30. In this embodiment, the current sensor 21 is provided in a positive electrode line PL that is connected to a positive electrode terminal of the battery pack 10. However, the current sensor 21 only needs to detect the current flowing into the battery pack 10, and thus a position at which the current sensor 21 is provided can appropriately be set. More specifically, the current sensor 21 may be provided in the positive electrode line PL or a negative electrode line NL that is connected to a negative electrode terminal of the battery pack 10. In addition, the plural current sensors 21 can be used.

A system main relay SMR-B is provided in the positive electrode line PL. The system main relay SMR-B is switched between ON and OFF by receiving a control signal from a higher electric control unit (ECU) 34. Here, the battery ECU 30 and the higher ECU 34 correspond to the controller in the invention.

Figure 2:
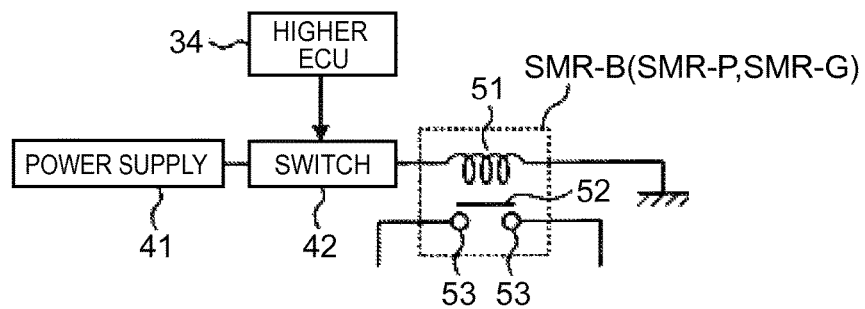
FIG. 2 is a view of a structure of a system main relay.

As shown in FIG. 2, the system main relay SMR-B has an excitation coil 51, a movable contact 52, and a fixed contact 53. One end of the excitation coil 51 is connected to a power supply 41 via a switch 42, and another end of the excitation coil 51 is grounded. As the power supply 41, for example, an auxiliary battery mounted in the vehicle can be used.

The switch 42 is switched between ON and OFF by receiving a control signal from the higher ECU 34. When the switch 42 is switched from OFF to ON, the current flows from the power supply 41 to the excitation coil 51, and a magnetic force is generated in the excitation coil 51. On the contrary, when the switch 42 is switched from ON to OFF, energization from the power supply 41 to the excitation coil 51 is cut off.

The movable contact 52 is urged in a direction to separate from the fixed contact 53 by a spring or the like, for example. When the current flows to the excitation coil 51, the magnetic force generated in the excitation coil 51 moves the movable contact 52 against an urging force. In this way, the movable contact 52 comes in contact with the fixed contact 53, and the system main relay SMR-B is switched from OFF to ON. On the contrary, when the energization to the excitation coil 51 is cut off, the movable contact 52 receives the urging force and separates from the fixed contact 53. In this way, the system main relay SMR-B is switched from ON to OFF.

In FIG. 1, a system main relay SMR-G is provided in the negative electrode line NL. The system main relay SMR-G is switched between ON and OFF by receiving the control signal from the higher ECU 34. A structure of the system main relay SMR-G is similar to a structure of the system main relay SMR-B (see FIG. 2).

A system main relay SMR-P and a current limiting resistor R1 are electrically connected to the system main relay SMR-G in parallel. The system main relay SMR-P and the current limiting resistor R1 are electrically connected in series. The system main relay SMR-P is switched between ON and OFF by receiving the control signal from the higher ECU 34. A structure of the system main relay SMR-P is similar to the structure of the system main relay SMR-B (see FIG. 2). The current limiting resistor R1 is used to suppress a flow of a rush current when the battery pack 10 is connected to a load (specifically, an inverter 22, which will be described below).

The battery pack 10 is connected to the inverter 22 via the positive electrode line PL and the negative electrode line NL. When the battery pack 10 is connected to the inverter 22, the higher ECU 34 first switches the system main relay SMR-B from OFF to ON, and then switches the system main relay SMR-P from OFF to ON. In this way, the current can flow through the current limiting resistor R1.

Next, after switching the system main relay SMR-G from OFF to ON, the higher ECU 34 switches the system main relay SMR-P from ON to OFF. In this way, the connection between the battery pack 10 and the inverter 22 is completed, and the battery system shown in FIG. 1 is brought into an activated state (Ready-On). The higher ECU 34 receives information on ON/OFF of an ignition switch of the vehicle. When the ignition switch is switched from OFF to ON, the higher ECU 34 activates the battery system shown in FIG. 1.

On the contrary, when the ignition switch is switched from ON to OFF, the higher ECU 34 switches the system main relays SMR-B, SMR-G from ON to OFF. In this way, the electric connection between the battery pack 10 and the inverter 22 is cut oft; and the battery system shown in FIG. 1 is brought into a stopped state (Ready-Off). When the battery system is in the stopped state, charging or discharging of the battery pack 10 is not performed.

The inverter 22 converts DC power that is output from the battery pack 10 to AC power and outputs the AC power to a motor generator (MG) 23. The motor generator 23 receives the AC power that is output from the inverter 22 and generates kinetic energy for traveling the vehicle. The kinetic energy generated by the motor generator 23 is transmitted to wheels, and thus the vehicle can travel.

When the vehicle is decelerated or stopped, the motor generator 23 converts kinetic energy that is generated during braking of the vehicle to electrical energy (the AC power). The inverter 22 converts the AC power that is generated by the motor generator 23 to the DC power and outputs the DC power to the battery pack 10. In this way, regenerative power can be charged in the battery pack 10.

The battery ECU 30 has a monitoring integrated circuit (IC) 31. The monitoring IC 31 is connected to each of the battery cells 11 via a voltage detection line L1, and detects a voltage value of each of the battery cells 11. Here, the voltage detection lines L1 are connected to a positive electrode terminal and a negative electrode terminal of each of the battery cells 11.

In this embodiment, the monitoring IC 31 detects the voltage value of the battery cell (corresponding to the electricity storage element in the invention) 11. However, the invention is not limited thereto. For example, the monitoring IC 31 can detect a voltage value of a battery block (corresponding to the electricity storage block in the invention) that includes the plural battery cells 11. Here, the voltage detection lines L1 are connected to the positive electrode terminal and the negative electrode terminal of each of the battery blocks.

The battery block can be constructed of the plural battery cells 11 that are electrically connected in series, for example. Alternatively, the battery block can be constructed of the plural battery cells 11 that are electrically connected in parallel, for example. The battery pack 10 can be constructed by electrically connecting the plural battery blocks in series.

The battery ECU 30 has a photocoupler 32 and a central processing unit (CPU) 33. The CPU 33 receives output of the monitoring IC 31 via the photocoupler 32. Here, a circuit located on an input side of the photo coupler 32 and a circuit located on an output side of the photocoupler 32 can be brought into insulated states by using the photocoupler 32. The CPU 33 can obtain the voltage value of the battery cell 11 on the basis of the output of the monitoring IC 31.

The battery ECU 30 (the CPU 33) outputs the obtained voltage value of the battery cell 11 to the higher ECU 34. The higher ECU 34 obtains the voltage value of the battery cell 11 from the battery ECU 30, and thus can control the charging and discharging of the battery pack 10 on the basis of this voltage value. Processing for controlling the charging and discharging of the battery pack 10 will be described below.

In this embodiment, the battery pack 10 is connected to the inverter 22. However, the invention is not limited thereto. More specifically, a voltage boosting circuit can be provided in a current path for connecting between the battery pack 10 and the inverter 22. The voltage boosting circuit can boost output voltage of the battery pack 10 and output the boosted power to the inverter 22. In addition, the voltage boosting circuit can lower output voltage of the inverter 22 and output the lowered power to the battery pack 10.

Next, a description will be made on the processing for controlling the charging and discharging of the battery pack 10 on the basis of the voltage value of the battery cell 11 with reference to a flowchart shown in FIG. 3. Here, the processing shown in FIG. 3 is executed by the higher ECU 34. More specifically, the higher ECU 34 executes the processing shown in FIG. 3 on the basis of a computer program that is incorporated in the higher ECU 34. In addition, the processing shown in FIG. 3 is repeatedly executed at specified time intervals.

In step S101, the higher ECU 34 obtains a voltage value Vb of each of the battery cells 11. Here, the battery ECU 30 detects the voltage value Vb of each of the battery cells 11 by using the monitoring IC 31, and outputs a detected result to the higher ECU 34.

In step S102, the higher ECU 34 determines whether the voltage value Vb is higher than an upper limit voltage value Vc_th. The upper limit voltage value Vc_th is a predetermined voltage value that is used to suppress overcharging of the battery cell 11. In other words, if the voltage value Vb is higher than the upper limit voltage value Vc_th, the higher ECU 34 can determine that the battery cell 11 is in an overcharged state. On the contrary, if the voltage value Vb is lower than the upper limit voltage value Vc_th, the higher ECU 34 can determine that the battery cell 11 is not in the overcharged state.

The determination on whether the battery cell 11 is in the overcharged state is preferably made before the battery cell 11 actually reaches the overcharged state. Accordingly, the upper limit voltage value Vc_th can be set to a lower value than the voltage value at which the battery cell 11 actually becomes overcharged. Information on the upper limit voltage value Vc_th can be stored in a memory.

In this embodiment, the voltage values of the plural battery cells 11 are detected, so as to suppress any of the battery cells 11 from becoming overcharged. Variability of a self-discharge characteristic and variability of internal resistance possibly occur among the plural battery cells 11, and, due to these types of variability, variability of the voltage value possibly occurs among the plural battery cells 11. In view of this, when the overcharged state of the battery cell 11 is determined, it is preferred to compare the highest voltage value Vb with the upper limit voltage value Vc_th.

If the voltage value Vb is higher than the upper limit voltage value Vc_th, the higher ECU 34 executes processing of step S104. On the contrary, if the voltage value Vb is lower than the upper limit voltage value Vc_th, the higher ECU 34 executes processing of step S103.

In step S103, the higher ECU 34 determines whether the voltage value Vb is lower than a lower limit voltage value Vd_th. The lower limit voltage value Vd_th is a predetermined voltage value that is used to suppress overdischarging of the battery cell 11. In other words, if the voltage value Vb is lower than the lower limit voltage value Vd_th, the higher ECU 34 can determine that the battery cell 11 is in an overdischarged state. On the contrary, if the voltage value Vb is higher than the lower limit voltage value Vd_th, the higher ECU 34 can determine that the battery cell 11 is not in the overdischarged state.

The determination on whether the battery cell 11 is in the overdischarged state is preferably made before the battery cell 11 actually reaches the overdischarged state. Accordingly, the lower limit voltage value Vd_th can be set to a lower value than the voltage value at which the battery cell 11 actually becomes overdischarged. Information on the lower limit voltage value Vd_th can be stored in a memory.

In this embodiment, the voltage values of the plural battery cells 11 are detected, so as to suppress any of the battery cells 11 from becoming overdischarged. As described above, the variability of the voltage value possibly occur among the plural battery cells 11 due to the variability of the self-discharge characteristic and the variability of the internal resistance. In view of this, when the overdischarging of the battery cell 11 is determined, it is preferred to compare the lowest voltage value Vb with the lower limit voltage value Vd_th.

If the voltage value Vb is lower than the lower limit voltage value Vd_th, the higher ECU 34 executes processing of step S105. On the contrary, if the voltage value Vb is higher than the lower limit voltage value Vd_th, the higher ECU 34 terminates the processing shown in FIG. 3.

In step S104, the higher ECU 34 limits charging of the battery pack 10. More specifically, the higher ECU 34 can limit the charging of the battery pack 10 by lowering upper limit power Win at which the charging of the battery pack 10 is allowed. Here, the higher ECU 34 controls the charging of the battery pack 10 such that input power (charging power) of the battery pack 10 does not exceed the upper limit power Win.

The upper limit power Win can be set in advance on the basis of a temperature or a state of charge (SOC) of the battery pack 10. Here, the SOC indicates a ratio of a current charge capacity to a full charge capacity. More specifically, the upper limit power Win can be reduced as the temperature of the battery pack 10 is increased, or the upper limit power Win can be reduced as the temperature of the battery pack 10 is lowered. Alternatively, the upper limit power Win can be reduced as the SOC of the battery pack 10 is increased. In the processing of step S104, the upper limit power Win is made lower than a value that is set in advance on the basis of the temperature or the SOC of the battery pack 10.

In step S105, the higher ECU 34 limits discharging of the battery pack 10. More specifically, the higher ECU 34 can limit the discharging of the battery pack 10 by lowering upper limit power Wout at which the discharging of the battery pack 10 is allowed. Here, the higher ECU 34 controls the discharging of the battery pack 10 such that output power (discharging power) of the battery pack 10 does not exceed the upper limit power Wout.

The upper limit power Wout can be set in advance on the basis of the temperature or the state of charge (SOC) of the battery pack 10. More specifically, the upper limit power Wout can be reduced as the temperature of the battery pack 10 is increased, or the upper limit power Wout can be reduced as the temperature of the battery pack 10 is lowered. Alternatively, the upper limit power Wout can be reduced as the SOC of the battery pack 10 is lowered.

In the processing of step S105, the upper limit power Wout is made lower than a value that is set in advance on the basis of the temperature or the SOC of the battery pack 10. Noted that limiting the discharging of the battery pack 10 includes stopping the discharging of the battery pack 10. Here, if the upper limit power Wout is set to 0 [kW], the discharging of the battery pack 10 can be stopped.

In the processing shown in FIG. 3, the charging and discharging of the battery pack 10 are controlled on the basis of the voltage value Vb of the battery cell 11. However, the invention is not limited thereto. For example, when the SOC of the battery pack 10 is computed, the charging and discharging of the battery pack 10 can be controlled on the basis of this SOC. For example, when the vehicle travels by using the battery pack 10 and a power supply (an engine, a fuel cell, or the like) other than the battery pack 10, the charging and discharging of the battery pack 10 can be controlled such that the SOC of the battery pack 10 changes along a reference SOC.

Here, the SOC of the battery pack 10 can be computed by using the voltage value Vb of the battery cell 11 or a value of the current flowing into the battery cell 11. Various methods for computing the SOC have conventionally been suggested, and any of these suggestions can appropriately be adopted. For this reason, a detailed method for computing the SOC will not be described here.

As shown in FIG. 4, a current cutoff circuit 60 is connected to the battery pack 10 via a voltage detection line L2. Here, the voltage detection line L2 is branched from the voltage detection line L1, and the same number of the voltage detection line L2 as the number of the voltage detection line L1 is provided.

The plural voltage detection lines L2 are connected to the positive electrode terminal and the negative electrode terminal of each of the battery cells 11, and the current cutoff circuit 60 can detect the voltage value of each of the battery cells 11. Noted that, as described above, when the plural voltage detection lines L1 are connected to the positive electrode terminal and the negative electrode terminal of the battery block, the current cutoff circuit 60 can detect a voltage value of the battery block by using the plural voltage detection lines L2.

The current cutoff circuit 60 cuts off the connection between the battery pack 10 and the inverter 22 when the battery cell 11 is in the overcharged state. More specifically, when the battery cell 11 is in the overcharged state, the current cutoff circuit 60 switches the system main relays SMR-B, SMR-G from ON to OFF. Here, the connection between the battery pack 10 and the inverter 22 only needs to be cut off. Thus, the current cutoff circuit 60 only needs to switch at least one of the system main relays SMR-B, SMR-G from ON to OFF.

More specifically, in the case where the voltage value of the battery cell 11 is higher than the voltage value that corresponds to the overcharged state, the current cutoff circuit 60 cuts off the energization to the excitation coil 51, and thus can switch the system main relays SMR-B, SMR-G from ON to OFF.

In this embodiment, ON/OFF of the system main relays SMR-B, SMR-G is switched when the system main relays SMR-B, SMR-G receives a command from the higher ECU 34 or receives a command from the current cutoff circuit 60. In other words, as control lines for switching ON/OFF of the system main relays SMR-B, SMR-G, a control line via the higher ECU 34 and a control line via the current cutoff circuit 60 are provided.

As shown in FIG. 4, these control lines are independent of each other. In other words, the current cutoff circuit 60 can switch the system main relays SMR-B, SMR-G from ON to OFF regardless of the control by the higher ECU 34. Here, when the current cutoff circuit 60 turns off the system main relays SMR-B, SMR-G, the higher ECU 34 cannot switch the system main relays SMR-B, SMR-G from OFF to ON.

Next, a description will be made on a configuration of the current cutoff circuit 60 by using FIG. 5.

The current cutoff circuit 60 has a resistor R2, and the resistor R2 is provided in each of the voltage detection lines L2. The resistor R2 is used to prevent application of excess voltage from the battery pack 10 (the battery cell 11) to the current cutoff circuit 60. More specifically, when the application of the excess voltage to the current cutoff circuit 60 is attempted, the resistor R2 is fused. In this way, the application of the excess voltage to the current cutoff circuit 60 can be prevented.

The current cutoff circuit 60 has plural Zener diodes D. Each of the Zener diodes D is electrically connected to each of the battery cells 11 in parallel via the voltage detection line L2. Here, a cathode of the Zener diode D is connected to a positive electrode terminal of the battery cell 11, and an anode of the Zener diode D is connected to a negative electrode terminal of the battery cell 11. The plural Zener diodes D are electrically connected in series.

The Zener diode D is used to suppress the application of the excess voltage from the battery pack 10 (the battery cell 11) to the current cutoff circuit 60. More specifically, when the application of the excess voltage to the current cutoff circuit 60 is attempted, the Zener diode D becomes conductive. In this way, the current can flow from the cathode to the anode side. Thus, the application of the excess voltage to an integrated circuit (IC) 61 side, which will be described below, can be suppressed.

When the Zener diode D becomes conductive, the current flows to the resistor R2, and thus the resistor R2 can be fused. In other words, when the application of the excess voltage from the battery pack 10 to the IC 61 is attempted, a connection between the battery pack 10 and the IC 61 can be cut off by fusing of the resistor R2. In this way, the IC 61 can be protected. Noted that the Zener diodes D can be removed as long as the application of the excess voltage to the current cutoff circuit 60 can be eliminated.

The current cutoff circuit 60 has a capacitor (corresponding to the filter circuit of the invention) C. One end of the capacitor C is connected to the voltage detection line L2, and another end of the capacitor C is grounded. The capacitor C is provided for each of the voltage detection lines L2 and used to reduce noise in the voltage detection line L2. A connection point of the capacitor C to the voltage detection line L2 is located between the IC 61, which will be described below, and a connection point of the Zener diode D to the voltage detection line L2. Noted that the capacitor C can be removed as long as an influence of the noise can be ignored.

The current cutoff circuit 60 has the IC 61. The IC 61 receives an activation signal and a stop signal from the battery ECU 30. The activation signal is a signal for allowing the power supply from the power supply to the IC 61, and the IC 61 can be operated by the activation signal. The stop signal is a signal for stopping the power supply from the power supply to the IC 61, and the operation of the IC 61 can be stopped by the stop signal.

In the case where the operation of the IC 61 can be stopped by the battery ECU 30, the operation of the IC 61 can also be stopped when the battery system shown in FIG. 1 is stopped. In this way, power consumption of the IC 61 can be reduced.

The IC 61 has a comparator (corresponding to the first comparator of the invention) CMP. The voltage detection line L2, which is connected to the positive electrode terminal of the battery cell 11, is connected to a negative-side input terminal of the comparator CMP. In addition, the voltage detection line L2, which is connected to the negative electrode terminal of the battery cell 11, is connected to a positive-side input terminal of the comparator CMP.

Here, as shown in FIG. 5, the voltage detection line L2 that is connected to the positive electrode terminal of the one battery cell 11 and the negative electrode terminal of the other battery cell 11 is branched. The branched voltage detection line L2 is connected to the positive-side input terminal in the one comparator CMP and the negative-side input terminal in the other comparator CMP.

The comparator CMP outputs a potential difference between the positive electrode terminal and the negative electrode terminal in the battery cell 11, in other words, the voltage value of the battery cell 11. The IC 61 has an OR circuit 62 that is connected to the comparator CMP, and an output signal of the comparator CMP is input to the OR circuit 62. The OR circuit 62 is connected to the plural comparators CMP. When the output signal of any of the comparators CMP is input to the OR circuit 62, the OR circuit 62 generates an output signal.

In this embodiment, each of the plural comparators CMP is operated at different timing from each other. In other words, the output signal of each of the plural comparators CMP is input to the OR circuit 62 at the different timing from each other. For this reason, every time the voltage value of each of the battery cells 11 is detected, the OR circuit 62 outputs a signal corresponding to this voltage value.

The IC 61 has an alarm confirming circuit 63 that is connected to the OR circuit 62, and the output signal of the OR circuit 62 is input to the alarm confirming circuit 63. The alarm confirming circuit 63 determines the overcharged state of the battery cell 11, and outputs an alarm signal when the battery cell 11 is in the overcharged state. The alarm signal is a signal indicating that the battery cell 11 is in the overcharged state.

Figure 6:
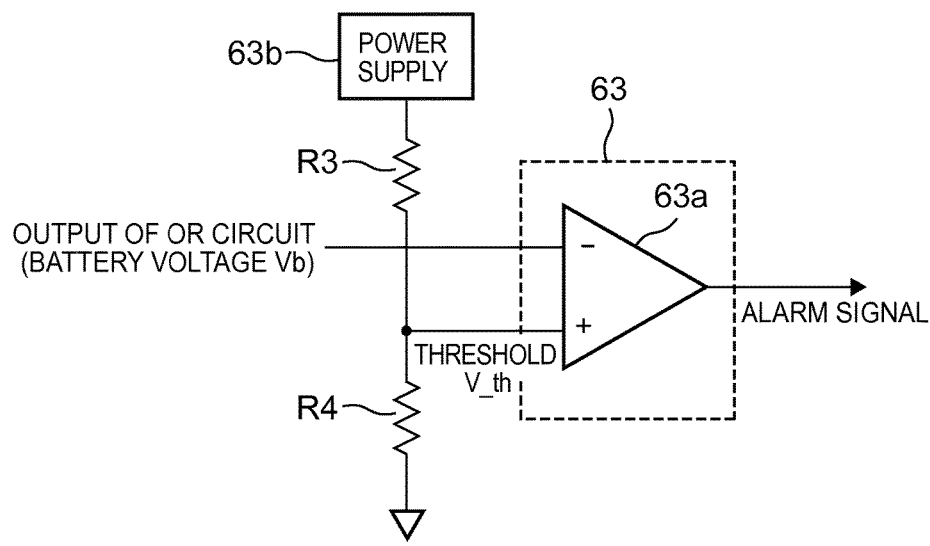
FIG. 6 is a view of a configuration of an alarm confirming circuit.

More specifically, as shown in FIG. 6, the alarm confirming circuit 63 can be configured by including a comparator (corresponding to the second comparator of the invention) 63a. The output signal of the OR circuit 62 (the voltage value Vb of the battery cell 11) is input to a negative-side input terminal of the comparator 63a. Meanwhile, threshold (a voltage value) V_th is input to a positive-side input terminal of the comparator 63a. The threshold V_th is generated by dividing the voltage value that is generated by a power supply 63b by using resistors R3, R4.

For example, the power supply 63b can lower the voltage value of the battery pack 10 (the battery cell 11) and output the lowered voltage (constant voltage). Here, the power supply 63b can be connected to the battery pack 10 (the battery cell 11) via the voltage detection line L2. The power of the battery pack 10 may be supplied to the power supply 63b. Alternatively, of all of the battery cells 11 that constitute the battery pack 10, the power of some of the battery cells 11 (the plural battery cells 11 connected in series) may be supplied to the power supply 63b.

The resistors R3, R4 are electrically connected to the power supply 63b in series, and a connection point of the resistors R3, R4 is connected to the positive-side input terminal of the comparator 63a. The threshold V_th is set in advance as will be described below. Thus, output voltage of the power supply 63b and resistance values of the resistors R3, R4 can be set such that the threshold V_th corresponds to a set value.

Here, the threshold (the voltage value) V_th is a voltage value for determining the overcharged state of the battery cell 11 and can appropriately be set in consideration of a charge/discharge characteristic of the battery cell 11 or the like. For example, as the threshold (the voltage value) V_th, a voltage value at which the battery cell 11 actually becomes overcharged can be set, or a lower value than the voltage value at which the battery cell 11 actually becomes overcharged can be set. Here, the threshold (the voltage value) V_th can be set as a higher value than the upper limit voltage value Vc_th, which is described in relation to the processing of step S102 shown in FIG. 3.

When the output signal of the OR circuit 62 (the voltage value Vb of the battery cell 11) is higher than the threshold (the voltage value) V_th, an output signal (an alarm signal) of the comparator 63a is generated. On the contrary, when the output signal of the OR circuit 62 (the voltage value Vb of the battery cell 11) is lower than the threshold (the voltage value) V_th, the output signal (the alarm signal) of the comparator 63a is not generated.

Figure 7:
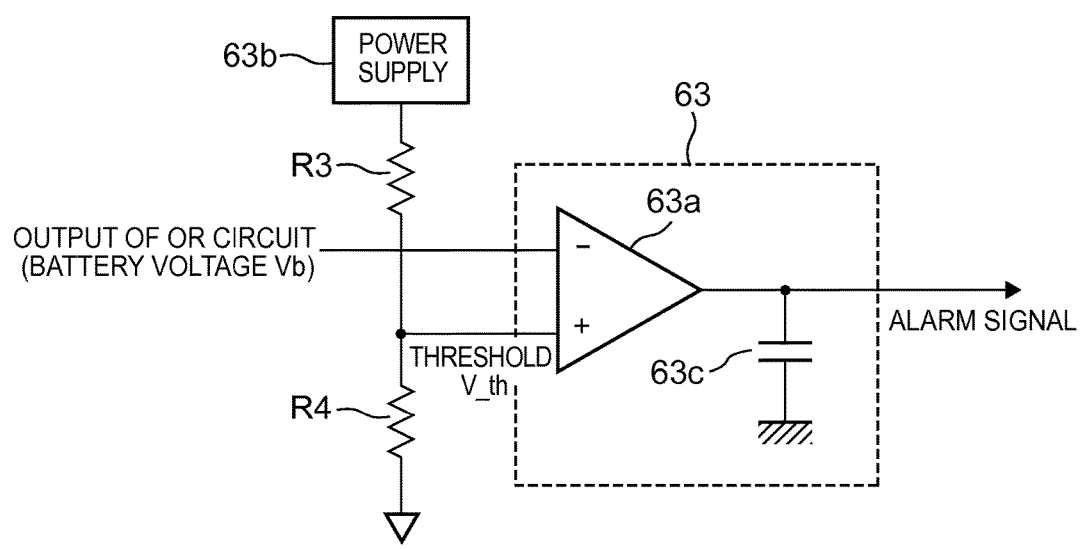
FIG. 7 is a view of another configuration of the alarm confirming circuit.

Alternatively, as the alarm confirming circuit 63, a configuration shown in FIG. 7 can be used. In FIG. 7, one end of a capacitor (corresponding to the filter circuit of the invention) 63c is connected to an output line of the comparator 63a. In addition, another end of the capacitor 63c is grounded. It is possible by providing the capacitor 63c to suppress the noise from being contained in an output signal of the alarm confirming circuit 63. In other words, reliability of the output signal (the alarm signal) of the alarm confirming circuit 63 can be improved by removing the noise by using the capacitor 63c.

In FIG. 5, the IC 61 has an alarm latch circuit 64 that is connected to the alarm confirming circuit 63, and the output signal (the alarm signal) of the alarm confirming circuit 63 is input to the alarm latch circuit 64. The alarm latch circuit 64 retains the input signal from the alarm confirming circuit 63 and outputs a latch signal (corresponding to the alarm signal).

The IC 61 (the alarm latch circuit 64) is connected to a photocoupler 65. The photo coupler 65 is used as a switch element and is switched from OFF to ON by receiving a latch signal from the alarm latch circuit 64. Being an insulating element, the photocoupler 65 allows a circuit that is located on an input side of the photocoupler 65 (a high-voltage circuit) and a circuit that is located on an output side of the photocoupler 65 (a low-voltage circuit) to be in insulated states. In other words, the photocoupler 65 can change a high-voltage signal as an input signal to a low-voltage signal as an output signal.

The photocoupler 65 is connected to an input terminal of an OR circuit 66. When the photocoupler 65 is switched from OFF to ON, the output signal of the photocoupler 65 is input to the input terminal of the OR circuit 66. When the output signal of the photocoupler 65 is input to the OR circuit 66, an output signal, (corresponding to the alarm signal) of the OR circuit 66 is generated.

An output terminal of the OR circuit 66 is connected to a delay circuit 67, and the output signal of the OR circuit 66 is input to the delay circuit 67. The delay circuit 67 outputs a signal (corresponding to the alarm signal) after a specified time has elapsed since the output signal of the OR circuit 66 is input. The delay circuit 67 is connected to a transistor (a switch) 68. When receiving the output signal of the delay circuit 67, the transistor 68 is switched from ON to OFF. Here, when the output signal of the delay circuit 67 is not input to the transistor 68, the transistor 68 is ON.

One end of the transistor 68 is connected to a power supply 69, and another end of the transistor 68 is connected to the excitation coils 51 of the system main relays SMR-B, SMR-G The power supply 69 shown in FIG. 5 is the same as the power supply 41 shown in FIG. 2. In addition, the transistor 68 is the same as the switch 42 shown in FIG. 2. Accordingly, the transistor 68 is operated by receiving the control signal from the higher ECU 34 or operated by receiving the output signal of the delay circuit 67.

As described by using FIG. 2, when the transistor 68 is ON, the current flows from the power supply 69 to the excitation coils 51, and thus the system main relays SMR-B, SMR-G are turned on. On the contrary, when the transistor 68 is OFF, the current supply from the power supply 69 to the excitation coils 51 is cut off, and thus the system main relays SMR-B, SMR-G are turned off.

According to this embodiment, when the IC 61 detects the overcharged state of the battery cell 11, the output signal (the alarm signal) of the IC 61 is input to the transistor 68, and thus the system main relays SMR-B, SMR-G can be switched from ON to OFF. In this way, the charging or discharging of the battery cell 11 in the overcharged state can be prevented.

In this embodiment, the system main relays SMR-B, SMR-G, SMR-P receive the control signal from the higher ECU 34 and are switched between ON and OFF. Meanwhile, when the battery cell 11 becomes overcharged, instead of the control by the higher ECU 34, the current cutoff circuit 60 switches the system main relays SMR-B, SMR-G from ON to OFF. In this way, drive control of each of the system main relays SMR-B, SMR-G is separately executed in a path that includes the higher ECU 34 and a path that includes the current cutoff circuit 60.

Accordingly, even when the design of the higher ECU 34 or the battery ECU 30 is changed, the current cutoff circuit 60 is not influenced by this design change. In other words, even after the design of the higher ECU 34 or the battery ECU 30 is changed, the current cutoff circuit 60 can be used continuously. During the overcharging of the battery cell 11, the current cutoff circuit 60 becomes a dedicated component for turning off the system main relays SMR-B, SMR-G, and thus versatility thereof can be increased.

As described above, the current cutoff circuit 60 is constructed by using electronic components (mainly semiconductor elements), and does not perform processing for which a computer program is used. Thus, when the current cutoff circuit 60 is used, the system main relays SMR-B, SMR-G can be driven with no consideration for a program bug. In addition, the semiconductor element is less likely to be deteriorated by wear (deteriorated by aging). Thus, the reliability of the component (the current cutoff circuit 60) can be improved by constituting the current cutoff circuit 60 by using the semiconductor element.

Noted that, in the configuration shown in FIG. 5, the one current cutoff circuit 60 is provided for the battery pack 10. However, the invention is not limited thereto. More specifically, when all of the battery cells 11, which constitute the battery pack 10, are divided into plural groups, the current cutoff circuit 60 can be provided for each of the groups.

Here, in the case where the current cutoff circuit 60 is provided for each of the groups, the circuit that is located on the output side of the photocoupler 65 can be shared. In other words, of the current cutoff circuit 60 shown in FIG. 5, the circuit that is located on the input side of the photocoupler 65 (including the photocoupler 65) can be provided for the number of the groups. Then, the output signal of each of the photo couplers 65 can be input to the OR circuit 66.

In this embodiment, the input terminal of the OR circuit 66 is connected to the battery ECU 30, and the output signal of the battery ECU 30 is input to the input terminal of the OR circuit 66. As described above, the battery ECU 30 outputs the activation signal and the stop signal to the IC 61. Thus, the signal for stopping the IC 61 is also input to the OR circuit 66.

When receiving the output signal of the photocoupler 65 or receiving the stop signal of the IC 61 from the battery ECU 30, the OR circuit 66 generates the output signal. Accordingly, the transistor 68 can be switched from ON to OFF, and the system main relays SMR-B, SMR-G can be switched from ON to OFF. Here, when the signal is not output from the photocoupler 65 to the OR circuit 66, and when the stop signal of the IC 61 is not output from the battery ECU 30, the OR circuit 66 does not generate the output signal.

As described above, even in the case where the IC 61 does not output the alarm signal but the battery ECU 30 outputs the stop signal of the IC 61, the transistor 68 is turned off. Thus, the system main relays SMR-B, SMR-G can be turned off.

In this way, when the operation of the IC 61 is stopped, the connection between the battery pack 10 and the inverter 22 is cut off, and thus the charging or discharging of the battery pack 10 can be stopped. In other words, when the operation of the IC 61 is stopped, the connection between the battery pack 10 and the inverter 22 can be prevented from being retained. Thus, it is possible to prevent such a situation that the charging or discharging of the battery pack 10 is performed while the IC 61 is not operated, and thus the battery cell 11 becomes overcharged.

Meanwhile, the output signal of the OR circuit 66 is not only input to the delay circuit 67 but also input to the battery ECU 30. In other words, when the alarm signal is output from the IC 61, this information is also transmitted to the battery ECU 30. In this way, on the basis of the overcharged state of the battery cell 11, the battery ECU 30 can confirm that the system main relays SMR-B, SMR-G are switched from ON to OFF.

In the case where the vehicle that is equipped with the battery system shown in FIG. 1 includes an engine, the battery ECU 30 can start the engine by receiving the output signal (the alarm signal) of the OR circuit 66. More specifically, when the output signal (the alarm signal) of the OR circuit 66 is input to the battery ECU 30, the battery ECU 30 outputs information obtained from the OR circuit 66 to the higher ECU 34. Then, the higher ECU 34 receives the information from the battery ECU 30 and starts the engine. Here, the engine can be started by using the output of the battery pack 10.

If the engine has already been started, the engine can remain ON while the output signal (the alarm signal) of the OR circuit 66 is input to the battery ECU 30. When the output signal (the alarm signal) of the OR circuit 66 is generated, as described above, the system main relays SMR-B, SMR-G are switched from ON to OFF, and the charging or discharging of the battery pack 10 is no longer performed. In this case, traveling of the vehicle can be secured by not stopping the engine.

In this embodiment, the delay circuit 67 is provided between the OR circuit 66 and the transistor 68. Accordingly, the engine can be started by inputting the output signal of the OR circuit 66 to the battery ECU 30 before the system main relays SMR-B, SMR-G are switched from ON to OFF on the basis of the output of the delay circuit 67. In other words, the engine can be started before the charging or discharging of the battery pack 10 is stopped.

In a configuration that the output power of the battery pack 10 is used to start the engine, if the charging or discharging of the battery pack 10 is stopped before the engine start, the engine cannot be started by using the output power of the battery pack 10. Thus, in order to secure the traveling of the vehicle, the engine needs to be started before the system main relays SMR-B, SMR-G are switched from ON to OFF.

In this embodiment, a time period in which the engine is started by the output power of the battery pack 10 is secured by using the delay circuit 67. On the premise of this, the system main relays SMR-B, SMR-G can be switched from ON to OFF. In this way, the vehicle can keep traveling by using the engine even when the charging or discharging of the battery pack 10 is stopped.

Noted that when a power supply (for example, the auxiliary battery) other than the battery pack 10 is used to start the engine, the delay circuit 67 can be removed. If the power supply other than the battery pack 10 is used as the power supply for the engine start, the engine can be started even after the charging or discharging of the battery pack 10 is stopped. In this case, there is no necessity to delay timing of the switching of the system main relays SMR-B, SMR-G from ON to OFF, and thus the delay circuit 67 can be removed.

In this embodiment, when the alarm signal is output from the alarm confirming circuit 63, the alarm signal is retained in the alarm latch circuit 64. In other words, after the alarm signal is output from the alarm confirming circuit 63, the signal is kept output from the alarm latch circuit 64, and the system main relays SMR-B, SMR-G remain OFF. If the alarm latch circuit 64 is removed, the alarm signal may be or may not be output from the alarm confirming circuit 63 in accordance with the voltage value of the battery cell 11.

Figure 8:
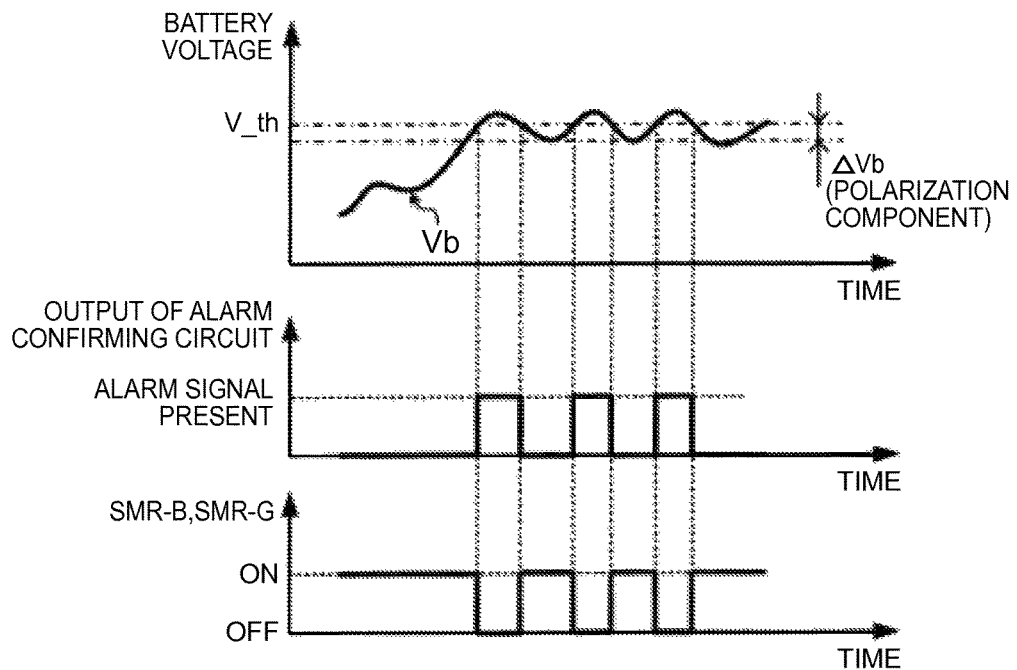
FIG. 8 includes charts for indicating output of an alarm confirming circuit and operations of system main relays in a configuration in which an alarm latch circuit is not provided.

FIG. 8 includes charts for showing a relationship between the output of the alarm confirming circuit 63 and ON/OFF of the system main relays SMR-B, SMR-G in a configuration from which the alarm latch circuit 64 is removed.

As shown in FIG. 8, in correspondence with a state that the voltage value Vb of the battery cell 11 reaches the threshold V_th, the alarm signal is output from the alarm confirming circuit 63. When the alarm signal is output, the system main relays SMR-B, SMR-G are switched from ON to OFF. Accordingly, the charging or discharging of the battery pack 10 (the battery cell 11) is no longer performed, and polarization of the battery pack 10 (the battery cell 11) is eliminated.

When the charging or discharging of the battery pack 10 (the battery cell 11) is performed, the polarization of the battery pack 10 occurs, and the voltage value of the battery cell 11 is changed with respect to open voltage by a variation in voltage that is associated with the polarization. When the charging or discharging of the battery pack 10 (the battery cell 11) is stopped, the polarization of the battery cell 11 is eliminated, and the voltage value Vb of the battery cell 11 is reduced by a variation in voltage (a voltage drop amount) $\Delta Vb$ that corresponds to the polarization. When the polarization is eliminated, the voltage value Vb becomes the open voltage of the battery cell 11.

When the voltage value Vb of the battery cell 11 is reduced in conjunction with the elimination of the polarization, there is a case where the voltage value Vb becomes lower than the threshold V_th. In particular, as the variation in voltage $\Delta Vb$ is increased, the voltage value Vb after the elimination of the polarization is more likely to become lower than the threshold V_th.

The variation in voltage $\Delta Vb$ is expressed by a product of a value of the current flowing through the battery cell 11 and the internal resistance of the battery cell 11. Accordingly, as the value of the current flowing through the battery cell 11 (a charged current) is increased, the variation in voltage ΔVb is increased. In addition, as the internal resistance of the battery cell 11 is increased, the variation in voltage ΔVb is increased. Here, as a temperature of the battery cell 11 is lowered, the internal resistance of the battery cell 11 is likely to be increased.

When the voltage value Vb of the battery cell 11 becomes lower than the threshold V_th in conjunction with the elimination of the polarization, the alarm signal is not output from the alarm confirming circuit 63, and the transistor 68 is switched from OFF to ON. In this way, the energization of the excitation coil 51 is allowed, and the system main relays SMR-B, SMR-G are switched from OFF to ON.

When the system main relays SMR-B, SMR-G are switched from OFF to ON, the charging or discharging of the battery pack 10 (the battery cell 11) is resumed. Accordingly, there is a case where the voltage value Vb of the battery cell 11 becomes higher than the threshold V_th again. When the voltage value Vb becomes higher than the threshold V_th, as described above, the system main relays SMR-B, SMR-G are switched from ON to OFF by the current cutoff circuit 60.

According to above-described behavior of the voltage value Vb, the system main relays SMR-B, SMR-G are repeatedly switched between ON and OFF. When the system main relays SMR-B, SMR-G are repeatedly switched between ON and OFF, just as described, the deterioration by wear of each of the system main relays SMR-B, SMR-G is progressed.

Figure 9:
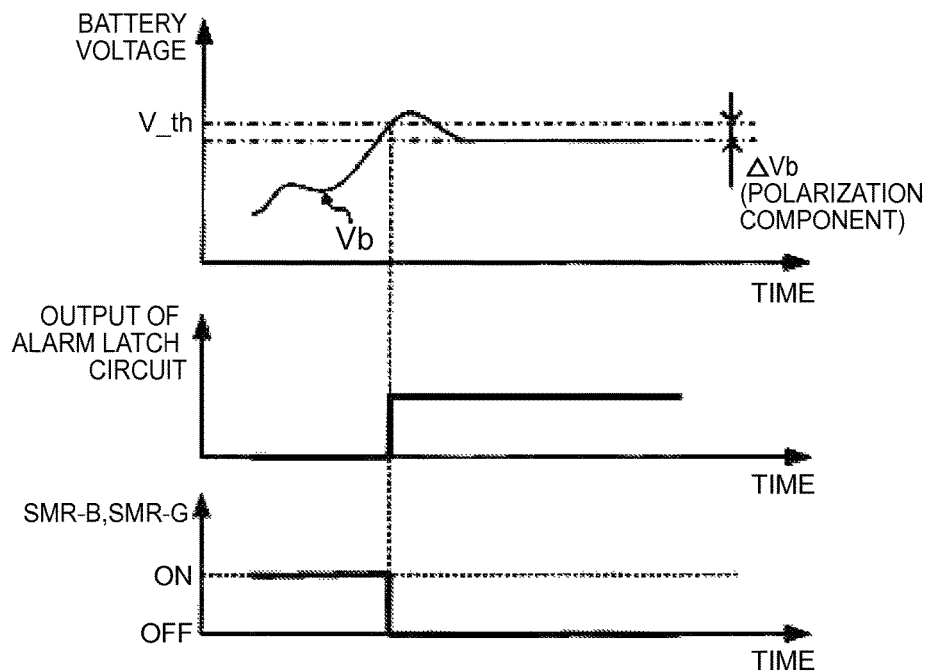
FIG. 9 includes charts for indicating the output of the alarm latch circuit and the operations of system main relays in a configuration in which the alarm latch circuit is provided.

In this embodiment, the alarm latch circuit 64 is provided. Thus, when the alarm signal is output from the alarm confirming circuit 63, as shown in FIG. 9, the alarm signal is retained by the alarm latch circuit 64. When the alarm signal is retained, the system main relays SMR-B, SMR-G remain OFF.

In this way, by the behavior of the voltage value Vb shown in FIG. 8, the system main relays SMR-B, SMR-G can be prevented from being repeatedly switched between ON and OFF. Here, since the system main relays SMR-B, SMR-G remain OFF, the voltage value Vb of the battery cell 11 is maintained in a state of being reduced by the variation in voltage ΔVb. In other words, the voltage value Vb of the battery cell 11 is maintained at the open voltage.

Second Embodiment

Next, a description will be made on a battery system as a second embodiment of the invention. In this embodiment, the same components as those described in the first embodiment are denoted by the same reference numerals, and the detailed description thereof will not be repeated. A following description will primarily be made on different points from the first embodiment.

In the first embodiment, the alarm signal is kept retained by using the alarm latch circuit 64. Meanwhile, the alarm latch circuit 64 is not provided in this embodiment. However, also in this embodiment, similar to the first embodiment, when the alarm signal is output, the output of the alarm signal continues.

Figure 10:
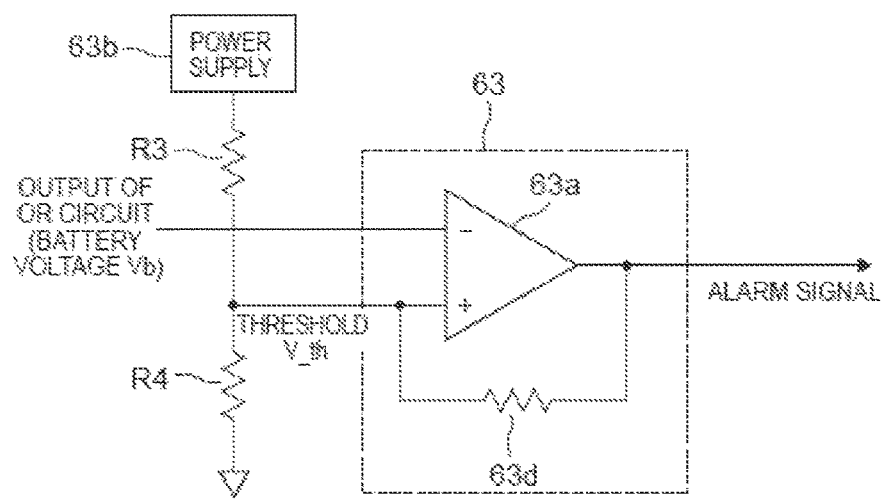
FIG. 10 is a view of a configuration of the alarm confirming circuit in a second embodiment.

In this embodiment, the alarm signal output from the alarm confirming circuit 63 is input to the photocoupler 65. FIG. 10 shows the configuration of the alarm confirming circuit 63 in this embodiment.

The positive-side input terminal of the comparator 63a and an output terminal of the comparator 63a are connected by a resistor 63d. That is, the alarm confirming circuit 63 is a hysteresis circuit. In the configuration shown in FIG. 10, a value obtained by dividing output voltage of the comparator 63a by the resistors 63d, R4 corresponds to the hysteresis. Thus, the hysteresis can be adjusted by appropriately setting the resistance value of each of the resistors 63d, R4.

In addition, the threshold V_th that is input to the comparator 63a can be set by dividing the voltage value of the power supply 63b by using the resistors R3, R4. Here, the power supply 63b can use the power of the battery pack 10 (the battery cell 11), for example.

When the voltage value Vb of the battery cell 11 is lower than the threshold (the voltage value) V_th, the alarm signal is not output from the comparator 63a. On the contrary, when the voltage value Vb is higher than the threshold V_th, the alarm signal is output from the comparator 63a. When the alarm signal is output, the hysteresis occurs, and the voltage value input to the positive-side input terminal of the comparator 63a becomes lower than the threshold V_th by the hysteresis.

Here, the voltage value that is input to the positive-side input terminal of the comparator 63a after the occurrence of the hysteresis is set as V_hys. A difference between the threshold V_th and the voltage value V_hys corresponds to the hysteresis.

As described by using FIG. 8, when the alarm signal is output from the alarm confirming circuit 63, the charging or discharging of the battery pack 10 is stopped, and the polarization of the battery pack 10 is eliminated. Then, in conjunction with the elimination of the polarization, the voltage value Vb is reduced by the variation in voltage ΔVb. In this embodiment, when the alarm signal is output from the comparator 63a, the voltage value that is input to the positive-side input terminal of the comparator 63a becomes lower than the threshold V_th.

Accordingly, even in the case where the voltage value Vb becomes lower than the threshold V_th in conjunction with the elimination of the polarization, the threshold V_th is reduced by the hysteresis, and thus the alarm signal can be kept output from the comparator 63a. More specifically, if the hysteresis is larger than the variation in voltage ΔVb, the voltage value Vb does not become lower than the voltage value V_hys. Thus, the alarm signal can be kept output from the comparator 63a.

Here, if the variation in voltage ΔVb is measured in advance by an experiment or the like, the hysteresis can be determined in consideration of the measured variation in voltage ΔVb. More specifically, a resistance value of the resistor 63d can be set such that the hysteresis becomes larger than the variation in voltage ΔVb. As described above, the variation in voltage ΔVb is changed in accordance with the value of the current flowing through the battery cell 11, the resistance value of the battery cell 11, or the like.

Accordingly, a possible maximum value of the variation in voltage ΔVb is identified in advance by an experiment or the like, and thus the hysteresis that is larger than the variation in voltage ΔVb can be set. In this way, even when the variation in voltage ΔVb is changed, the alarm signal can be kept output from the comparator 63a.

Figure 11:
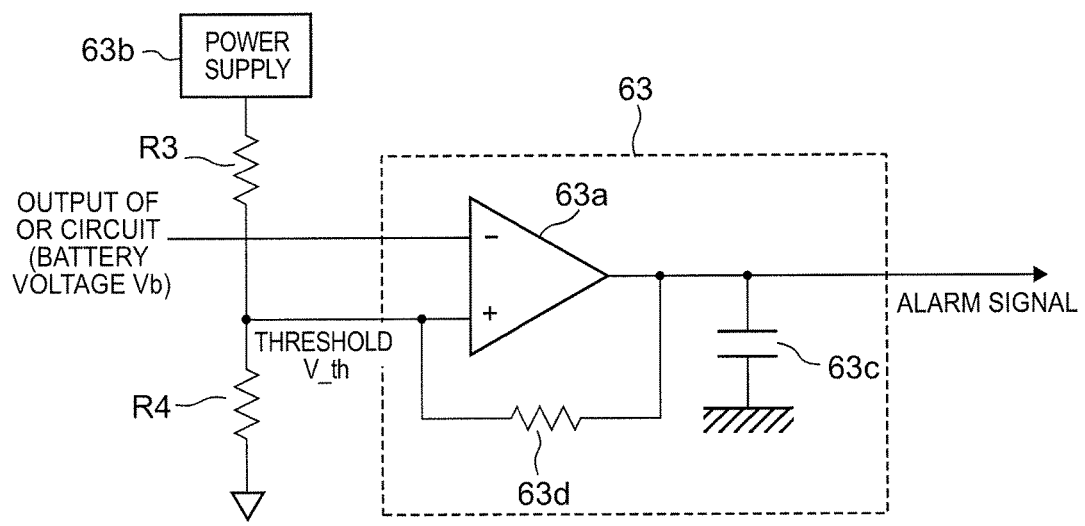
FIG. 11 is a view of another configuration of the alarm confirming circuit in the second embodiment.

Noted that, instead of the configuration shown in FIG. 10, a configuration shown in FIG. 11 can be used. The configuration shown in FIG. 10 corresponds to the configuration that is shown in FIG. 6 and described in the first embodiment, and the configuration shown in FIG. 11 corresponds to the configuration that is shown in FIG. 7 and described in the first embodiment. In the configuration shown in FIG. 11, the capacitor 63c is connected to the output line of the comparator 63a.

Here, a connection point of the resistor 63d to the output line of the comparator 63a is located between the output terminal of the comparator 63a and the connection point of the capacitor 63c to the output line. According to the configuration shown in FIG. 11, similar to the configuration shown in FIG. 7, the noise contained in the output signal of the comparator 63a can be reduced.

According to this embodiment, the alarm signal can be kept output by setting the alarm confirming circuit 63 as the hysteresis circuit. In other words, the alarm confirming circuit 63 can have a function that is equivalent to that of the alarm latch circuit 64 described in the first embodiment. In this way, the system main relays SMR-B, SMR-G can be prevented from being repeatedly switched between ON and OFF by suppressing the behavior of the voltage value Vb shown in FIG. 8. In addition, the progress in the deterioration by wear of the system main relays SMR-B, SMR-G can be suppressed.

Furthermore, in this embodiment, compared to the current cutoff circuit 60 described in the first embodiment, the configuration of the current cutoff circuit 60 can be simplified by removal of the alarm latch circuit 64, and thus the current cutoff circuit 60 can be downsized.

The invention claimed is:

1. An electricity storage system comprising:
   an electricity storage block including an electricity storage element for performing charging and discharging and capable of being connected to a load;
   a relay configured to be switched between an ON state and an OFF state, the electricity storage block and the load being connected when the relay is in the ON state, and a connection between the electricity storage block and the load being cut off when the relay is in the OFF state;
   a controller configured to control the ON state and the OFF state of the relay; and
   a current cutoff circuit configured to switch the relay from the ON state to the OFF state, so as to cut off energization of the electricity storage block,
   the current cutoff circuit including:
      an alarm circuit configured to output an alarm signal indicating that the electricity storage block is in an overcharged state by comparing a voltage value of the electricity storage block and a threshold;
   a latch circuit for retaining the alarm signal; and
   a transistor configured to receive an output signal from the latch circuit and switching the relay from the ON state to the OFF state.

2. The electricity storage system according to claim 1, wherein
   the alarm circuit has a first comparator and a second comparator,
   the first comparator configured to detect a potential difference between a positive electrode and a negative electrode of the electricity storage block, and
   the second comparator configured to compare output of the first comparator with the threshold.

3. The electricity storage system according to claim 2, wherein the alarm circuit includes a filter circuit, the filter circuit being connected to an output line of the second comparator.

4. The electricity storage system according to claim 1, wherein the current cutoff circuit includes a photocoupler, the photocoupler being provided between the latch circuit and the transistor.

5. The electricity storage system according to claim 1, wherein current cutoff circuit includes a second filter circuit, the second filter circuit including a filter circuit that that is connected to a line for connecting the alarm circuit and the electricity storage block.

6. The electricity storage system according to claim 1, wherein current cutoff circuit has a Zener diode, a cathode of the Zener diode being connected to a positive electrode terminal of the electricity storage block, and an anode of the Zener diode being connected to a negative electrode terminal of the electricity storage block.

7. The electricity storage system according to claim 1 comprising:
   an engine, wherein the electricity storage block outputs power that is converted to kinetic energy for traveling the vehicle and outputs power for starting the engine to the vehicle,
   the current cutoff circuit includes a delay circuit being provided between the latch circuit and the transistor, and
   the controller receives the output signal of the latch circuit and starts the engine.

8. The electricity storage system according to claim 1, wherein
   the current cutoff circuit includes an OR circuit, the OR circuit being provided between the latch circuit and the transistor, and
   the OR circuit receives the output signal of the latch circuit or a signal that is output from the controller to stop an operation of the current cutoff circuit, and thus outputs a signal for switching the transistor to an OFF state.

9. An electricity storage system comprising:
   an electricity storage block including an electricity storage element for performing charging and discharging;
   a relay configured to be switched between an ON state and an OFF state, the electricity storage block and the load being connected when the relay is in the ON state, and a connection between the electricity storage block and the load being cut off when the relay is in the OFF state;
   a controller configured to control the ON state and the OFF state of the relay; and
   a current cutoff circuit configured to switch the relay from the ON state to the OFF state, so as to cut off energization of the electricity storage block,
   the current cutoff circuit including:
      an alarm circuit configured to output an alarm signal indicating that the electricity storage block is in an overcharged state by comparing a voltage value of the electricity storage block and a threshold;
   the alarm circuit including
      a comparator, the comparator having a hysteresis characteristic that is larger than a voltage drop amount of the electricity storage block after the energization of the electricity storage block is cut off, and
   a transistor configured to receive an output signal of the alarm circuit and switch the relay from the ON state to the OFF state.

10. The electricity storage system according to claim 1, wherein a plural electricity storage blocks are electrically connected in series.

* * * * *